US006628429B1

(12) United States Patent
Razazian

(10) Patent No.: US 6,628,429 B1
(45) Date of Patent: Sep. 30, 2003

(54) SYSTEM AND METHOD TO EFFECTIVELY SUPPRESS IDLE FAX SIGNALS

(75) Inventor: Kaveh Razazian, Aliso Viejo, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/438,813

(22) Filed: Nov. 10, 1999

Related U.S. Application Data

(60) Provisional application No. 60/108,419, filed on Nov. 10, 1998.

(51) Int. Cl.[7] .............................. H04N 1/32; H04N 1/00; H04M 11/00
(52) U.S. Cl. ........................ 358/426; 358/434; 358/437; 358/440; 358/406; 379/93.08
(58) Field of Search ............................... 358/426, 437, 358/434, 440, 406; 379/93.08

(56) References Cited

U.S. PATENT DOCUMENTS 5,878,119 A * 3/1999 Chellali et al. ............. 358/468
6,373,597 B1 * 4/2002 Suzuki et al. ............... 358/434

* cited by examiner

Primary Examiner—Edward Coles
Assistant Examiner—Houshang Safaipour
(74) Attorney, Agent, or Firm—Blakely Sokoloff Taylor & Zafman LLP

(57) ABSTRACT

The present invention provides a system and method to effectively suppress idle fax signals. In one embodiment, the method includes detecting a fax indicator signal. The method further includes calculating a short term energy of the fax indicator signal. The method also includes calculating a short term energy of fax data subsequent to the fax indicator signal. In addition, the method includes discarding the fax data when the short term energy of the fax data fails to exceed the short term energy of the fax indicator signal.

26 Claims, 5 Drawing Sheets

SYSTEM AND METHOD TO EFFECTIVELY SUPPRESS IDLE FAX SIGNALS

RELATED APPLICATION

This application claims the benefit U.S. Provisional Patent Application No. 60/108,419 filed on Nov. 10, 1998.

FIELD OF THE INVENTION

This invention relates generally to the field of transmitting and processing telecommunication data, and particularly to a system and method to effectively suppress idle fax signals.

BACKGROUND OF THE INVENTION

During a transmission of a fax, there may be idle time periods where only idle signals are transmitted. To make the fax transmission more efficient, these idle signals should be suppressed and not sent to the receiving telecommunication device. Furthermore, care must be taken to avoid accidental suppression of valid fax data.

Accordingly, a system and method to effectively suppress idle fax signals without affecting transmission of valid fax data is desired.

SUMMARY OF THE INVENTION

The present invention provides a system and method to effectively suppress idle fax signals.

In accordance with one embodiment of the present invention, short term energy levels of a fax indicator signal and fax data following the fax indicator signal are computed. The short term energy of the fax data is compared to the short term energy of the fax indicator signal. If the short term energy of the fax data exceeds the short term energy of the fax indicator signal by a predetermined energy level value, the fax data is presumed to be valid fax data and is transmitted. If the short term energy of the fax data fails to exceed the short term energy of the fax indicator signal by a predetermined energy level continuously for a selected period of time or a hang over time, the fax data is presumed to be void or invalid fax data and is discarded. Since only valid fax data is transmitted, the amount of bandwidth required to transmit the fax data is generally reduced.

In one embodiment, the method includes detecting a fax indicator signal. The method further includes calculating a short term energy of the fax indicator signal. The method also includes calculating a short term energy of fax data subsequent to the fax indicator signal. In addition, the method includes discarding the fax data when the short term energy of the fax data fails to exceed the short term energy of the fax indicator signal.

The above described and many other features of the present invention will become apparent as the invention becomes better understood by reference to the following detailed description when considered in conjunction with the accompanying drawings.

DETAILED DISCLOSURE OF THE EMBODIMENTS

The present invention provides a system and method to effectively suppress idle fax signals. In the following description, various embodiments of the present invention will be described. The description will include certain details such as the type of data being transmitted and the protocols used. However, such details are included to facilitate understanding of the invention and to describe exemplary embodiments for implementing the invention. Such details should not be used to limit the invention to the particular embodiments described because other variations which would be obvious to one of ordinary skill in the art are possible while staying within the scope of the invention.

Figure 1:
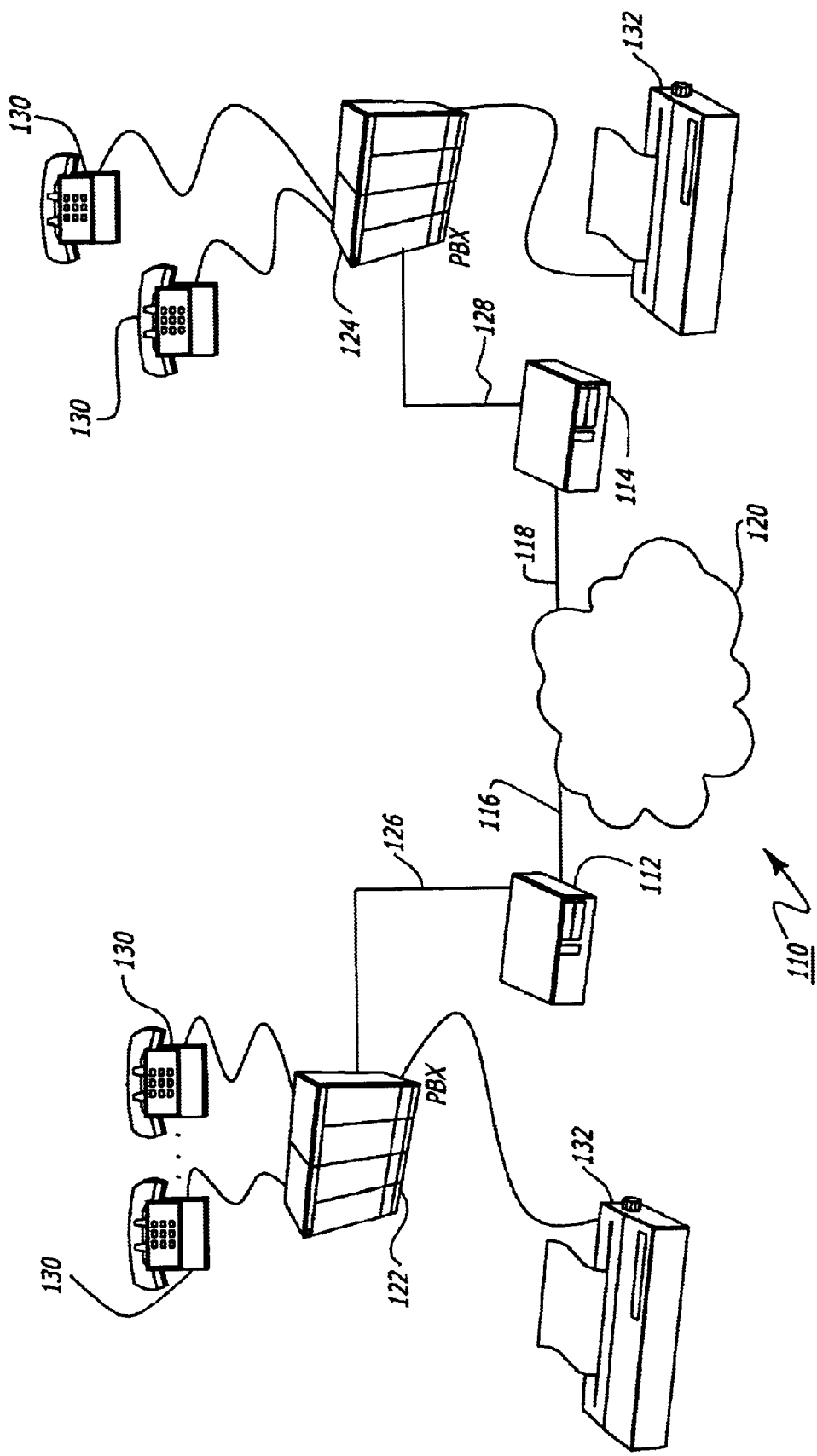
FIG. 1 shows a telecommunication system in accordance with one embodiment of the present invention.

FIG. 1 shows a telecommunication system 110 in accordance with one embodiment of the present invention. Access devices 112, 114 are coupled together by network links 116, 118 and network 120. Network 120 is typically a data network which may contain switching or routing equipment designed to transfer digital data. Access devices 112, 114 are coupled to private branch exchange (PBX) 122, 124 respectively. Each PBX 122, 124 is coupled to a plurality of telecommunication devices, such as telephones 130 and fax machine 132.

Each PBX 122, 124 is connected to an access device 112, 114 through an access link 126, 128. In one embodiment, an access link 126, 128 can be a digital signal level one (DS-1) line. In North America, including United States and Canada, a DS-1 line is equivalent to a trunk level one (T1) that is capable of carrying information at the transfer rate of 1.544 Mbps. Outside of North America, a DS-1 line is equivalent to an E-1 line that has a transfer rate of 2.048 Mbps. The access link 126, 128 is divided into data signal, level zero (DS-0) channels. Each DS-0 channel has a transfer rate of 64-Kbps. Accordingly, a T-1 access link has twenty-four (24) DS-0 channels, and an E-1 access link has thirty-two (32) DS-0 channels.

Each PBX 122, 124 gains access to the network 120 through an access device 112,114. It should be noted that in an alternative telecommunication that supports wireless telecommunication devices, PBX 112,114 may not be required to connect the wireless telecommunication devices to the access devices 112,114. Access devices 112,114 convert analog voice and fax signals to digital data, assemble the digital data into packets, cells, or frames, and send the packets, cells, or frames to network 120. Each packet, cell, or frame of data contains the target address, which is used to direct the packet, cell, or frame through the network to its intended destination. Once the packet, cell, or frame of data enters the shared network 120, any number of networking protocols, such as TCP/IP, ATM, Frame Relay, or the like, can be employed to carry the packet, cell, or frame to its intended destination. The general requirement is that the network protocol supports shared devices to allow multiple users to utilize network 120 simultaneously.

The packets, cells, or frames of data are generally sent from access devices 112,114 over virtual paths or connections established between the devices 112, 114. Access devices 112,114 are responsible for negotiating and establishing the virtual paths or connections.

The current invention focuses on access devices 112, 114, which transfer the data from telecommunication devices, such as telephones 130 and fax machine 132 to the network 120. Each access devices 112,114 typically includes two data paths, an ingress route which transfers data from telecommunication devices 130,132 and an ingress route which transfers data to network 120 to telecommunication devices 130, 132. The current invention focuses on the ingress route, the transmission of data from telecommunication devices to network 120.

Figure 2:
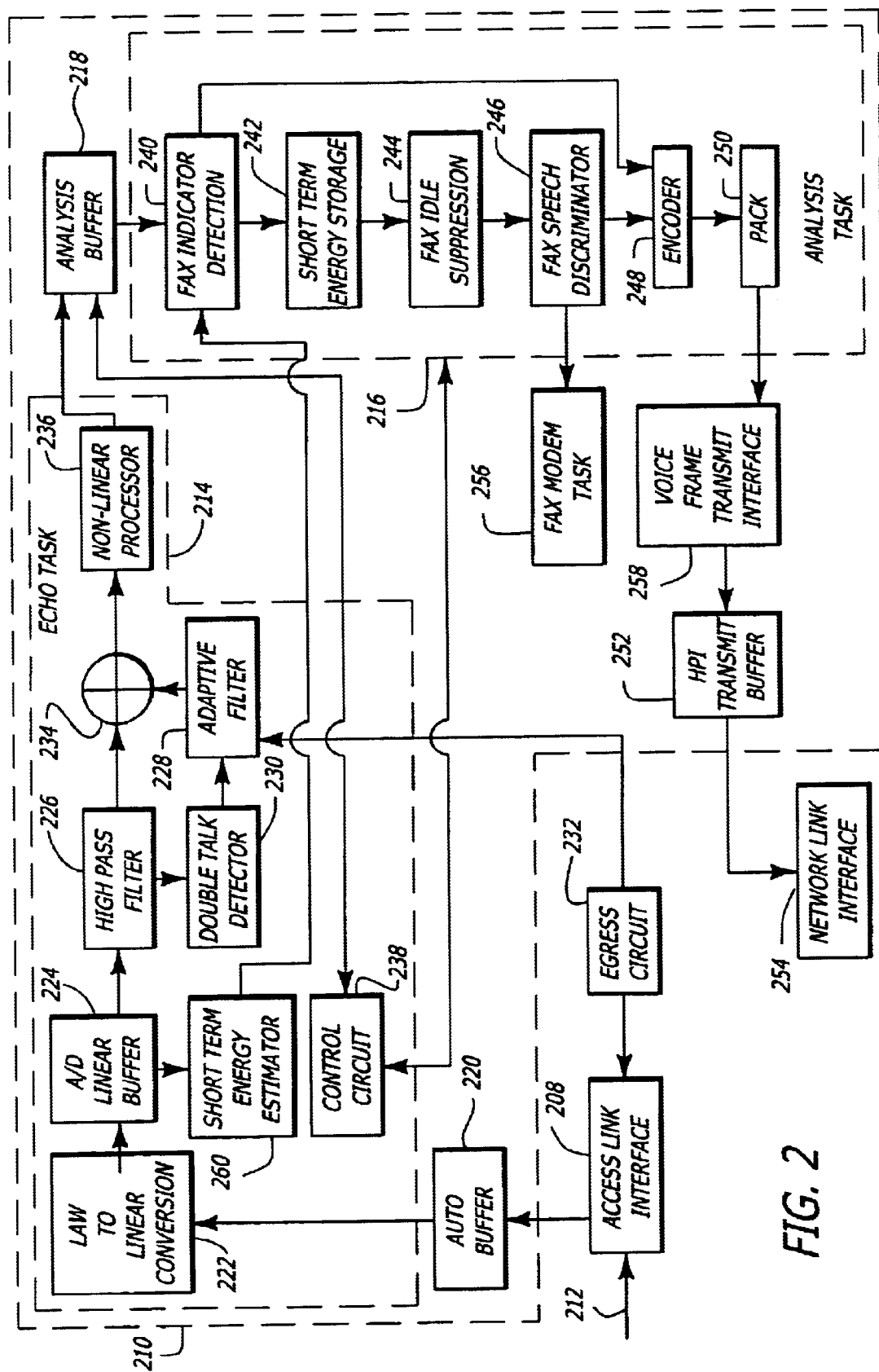
FIG. 2 illustrates a block diagram of an access device which receives incoming signals at an access link interface or port.

FIG. 2 illustrates a block diagram of an embodiment of access device 112, 114, as shown in FIG. 1. Access link interface or port 208 receives telecommunication data in a variety of formats or types, e.g., speech data and fax data, through access link 212. In one embodiment, a stream of data is received using a time division multiplexing (TDM) technique. Access link interface 208 transfers the received telephone communication data from access link 212 to an egress route 210.

Although FIG. 2 illustrates a hardware implementation of the invention, it is recognized that software modules may be used in an alternative embodiment to implement the described invention. If the aforementioned functional components are implemented in software, these components be stored on a computer-readable medium, such as floppy disk, hard drive, CD-ROM, DVD, tape, memory, or any storage device that is accessible by a computer.

When the stream of data is received, ingress route 210 may include circuitry to generate packets, cells, or frames of data. For example, a digital signal processing (DSP) circuit can be used to convert 1.25-usec samples of incoming signal into a 5-msec frame of Pulse Code Modulation (PCM) data or a 10-msec frame of G.726 data. The frames undergo processing including compression using one of several compression routines.

Along ingress route 210, the incoming signal is processed to (1) remove echoes and (2) analyze and encode the data for transmission. Echo task circuit 214 performs removal of echoes while analysis task circuit 216 performs the processing and encoding of data. Analysis buffer 218 receives data from the output of echo task circuit 214. The output of analysis buffer 218 is input into analysis task circuit 216. The following detailed descriptions will describe one embodiment of echo task circuit 214, analysis task circuit 216, and analysis buffer 218.

Echo task circuit 214 is used to cancel line echoes (e.g., electrical echoes). Such echo cancellation is important in teleconference systems where two or more parties are connected via full duplex links to alleviate acoustic feedback problems.

Auto buffer 220 is used to accumulate data from source or transmitting telecommunication devices into samples appropriate for processing by echo task circuit 214. In one embodiment, auto buffer 220 stores 10-byte samples. The 10-byte samples are transmitted to echo task circuit 214 where linear converter 222 converts the received digital data to linear data. In one embodiment of the invention, PCM data received in 18-bit segments is converted to a linear format. The output of linear converter 222 is transferred to an analog to digital (A/D) linear buffer 224 which stores the data until high pass filter 226 is ready to receive data.

High pass filter 226, adaptive filter 228, and double-talk detector 230 collectively operate as echo cancellation circuitry to remove echoes by subtracting a filtered output. Such a procedure is well known and described in detail in the Electrical Engineering Handbook by Richard C. Dorf, pages 401 to 403, published by IEEE, copyrighted 1993.

More specifically, high pass filter 226 of echo cancellation circuit 214 removes DC offsets from the received signal. The output of high pass filter 226 is transmitted to a double-talk detector 230 and adaptive filter 228. Adaptive filter also receive data from both double-talk detector 230 and egress circuit 232. When speech signal is locally present in high pass filter 226, adaptive filter 228 uses summation circuit 234 to subtract the speech signal in the high pass filter from the speech signal coming from egress circuit 232. Failure to cancel such echoes may result in acoustic feedback or "howling". Thus, echo task circuit 214 typically is always running and interactively processing incoming signal to cancel out echoes or feedback in the incoming signal. In the situation where a caller and a callee at both ends of a phone call speak simultaneously, the power level of the incoming signal is increased. In this situation, double-talk detector 230 monitors the power level of the incoming signal level to determine whether the power level of the incoming signal exceeds a predetermined level. If the power level of the power level of the incoming signal exceeds the predetermined level, double-talk detector 230 momentarily disables adaptive filter 228. Non-linear processor 236 monitors the incoming signal to detect silent periods and controls adaptive filter 228 so that no incoming signal is processed during these silent periods.

Control circuit 238 continuously monitors incoming signals from access link 212 and controls the flow of data through echo task circuit 214, analysis task circuit 216 and analysis buffer 218. Control circuit 238 may also maintain flags indicating when analysis buffer 218 is ready to transfer data, what compression routine is being used by analysis task circuit 216 and other related information. In one embodiment of control circuit 238, a processor executes a computer program to implement control functions of egress route 210. In the embodiment illustrated in FIG. 2, control circuit 238 is implemented in echo task circuit 214.

Analysis buffer 218 generally stores the data output by echo task circuit 214 until needed by analysis task circuit 216. Analysis buffer 218 is relatively large, for example 256 bytes in one embodiment of the invention. Typically, the size of analysis buffer 218 is greater than twice the largest frame size times the number of channels being transmitted. Data is temporarily stored and tracked in analysis buffer 218 until one packet, cell, or frame of data is accumulated. The accumulated packet, cell, or frame of data is then transferred to analysis task circuit 216. For example, when Pulse Code Modulation (PCM) protocol is used, analysis buffer 218 stores the data and determines when forty (40) bytes of data have been accumulated to form a frame of PCM data. Other protocols such as a G.726 protocol may cause analysis buffer 218 to accumulate data until eighty (80) bytes of data have been received to form a frame of G.726 data.

Control circuit 238 determines the protocol used to transmit data over network 120 of FIG. 1. Analysis task circuit 216 processes the incoming data according to the protocol selected for transmission by network 120 of FIG. 1. In one embodiment of egress route 210, analysis buffer 218 transfers stored data to fax speech discriminator 246 of analysis task circuit 216.

Short term energy estimator 260 calculates the short term energy of the input signal in decibels (dB). To calculate short term energy, long term energy needs to be calculated. Long term energy, $E_l$, is calculated by squaring each sample ($s_i$) of the input signal and summing the squared result, as defined by the following equation (1).

$$E_l = \sum_{i=0}^{N-1} (s_i)^2 \qquad (1)$$

The short term energy, $E_s(n)$, can be obtained from the long term energy ($E_l$), as shown in the following equation (2).

$$E_s(n) = (\alpha \times E_l(k)) + ((1-\alpha) \times E_s(n-1)), \qquad (2)$$

where "$\alpha$" is approximately 0.25 for this embodiment.

Short-term energy in decibels, $E_{sdB}$, is then calculated as shown in the following equation (3).

$$E_{sdB} = 10 \log_{10} E_s(n) \qquad (3)$$

Fax indicator detection circuit 240 monitors the incoming signal to look for a fax indicator signal. Source telecommunication devices typically transmit a 2,100-Hertz signal indicate that a fax is about to be transmitted. If fax indicator detection circuit 240 does not detect a fax indicator signal, analysis task circuit 216 assumes that the incoming signal contains speech or voice data and sends the incoming signal to encoder 248 to be processed as speech or voice data. If fax indicator detection circuit 240 detects the fax indicator signal, short term energy storage circuit 242 and fax idle suppression circuit 244 are invoked to generally discard invalid fax data.

Short term energy storage circuit 242 stores the short term energy levels in dB of the fax indicator signal and the fax data following the fax indicator signal. As stated above, short term energy estimator 260 calculates these short term energy levels in dB.

Fax idle suppression circuit 244 generally monitors the fax data following the fax indicator signal, and discards invalid fax data. Generally, fax idle suppression circuit 244 determines whether the fax data is valid or invalid by comparing the short term energy level in decibels (dB) of the fax data to the sum of (1) the short term energy level in decibels (dB) of the fax indicator signal and (2) a predetermined value. A more detailed description of the operation of fax idle suppression circuit 244 is provided below in FIGS. 4 and 5 and the discussion accompanying these figures.

Fax speech discriminator 246 determines whether the incoming signal is a speech or fax data. In general, the fax speech discriminator monitors the energy level of the incoming signal. When speech signal is detected continuously for a predetermined period of time, fax speech discriminator 246 switches analysis task circuit 216 from a fax mode to a speech mode of operation. Generally, when fax speech discriminator 246 detects an incoming fax signal, fax speech discriminator 246 forwards the incoming data to fax/modem task circuit 256. Fax/modem circuit 256 stores current voice digitizing method and switches between compression/ encoding methods such as PCM encoding to achieve the highest possible data rate connection.

When fax speech discriminator circuit 246 detects speech data in the incoming signal, fax speech discriminator circuit 246 forwards the speech data to encoder 248. Encoder 248 encodes the speech data and forwards the encoded speech data to pack circuit 250 for packing. Encoding the speech data in encoder circuit 248 and packing the data in pack circuit 250 produces a compressed signal. Control circuit 238 instructs encoder 248 and pack circuit 250 to produce data conforming to a selected speech compression for transmission at a particular data rate. The speech compression or data rate selection is based on the needs of the transmitting or source telecommunication device and the capabilities of network 120, as shown in FIG. 1. The compressed data or signal is transferred to a voice frame transmit interface 258 which prepares the data for transmission over network 120, as shown in FIG. 1.

Once voice frame transmit interface 258 has prepared the data in a format appropriate for transmission over network 120, the data is forwarded to transmit buffer 252 which stores the data. Transmit buffer 252 transfers data to the network through network link interface 254.

Figure 3:
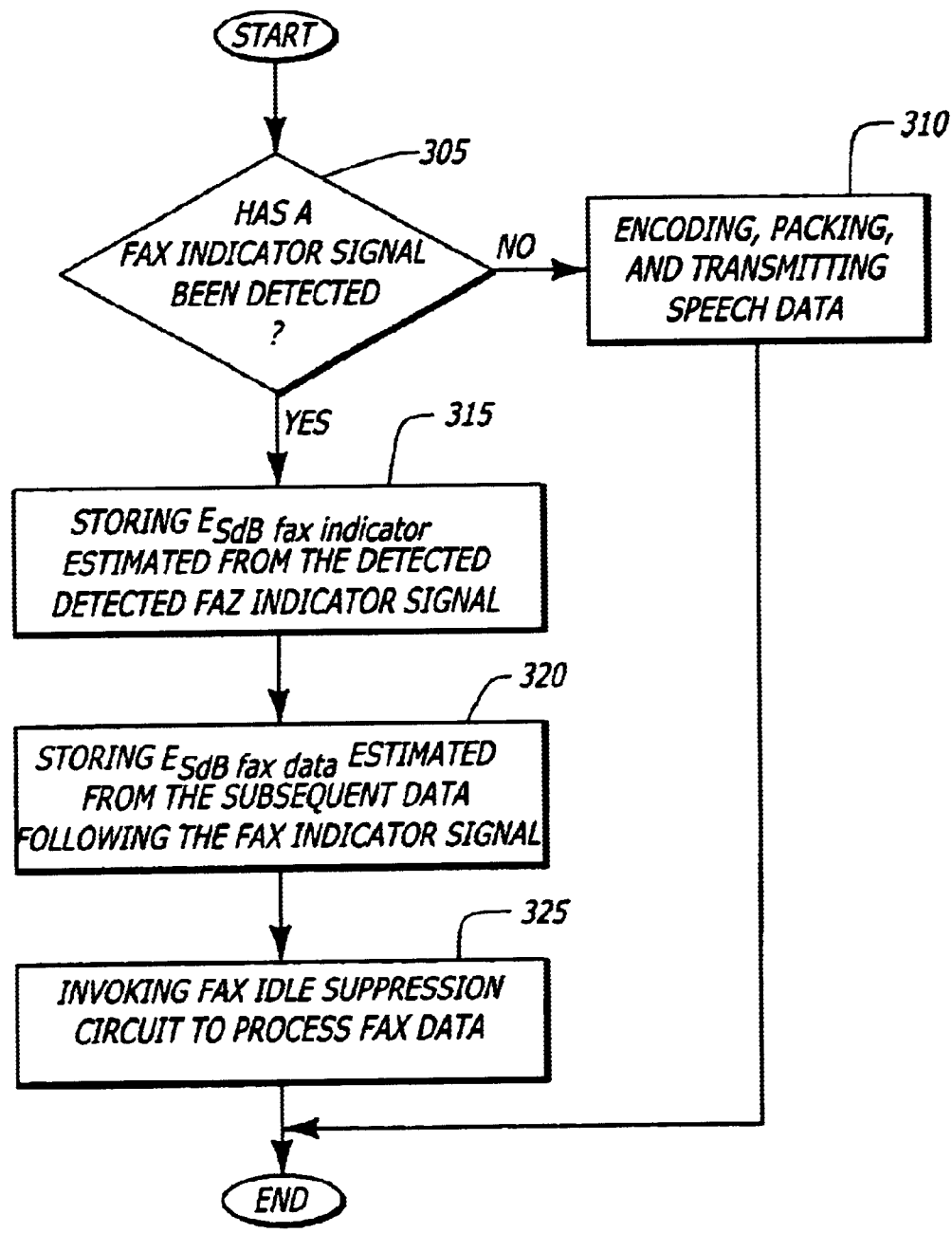
FIG. 3 is a flow diagram outlining the processing of incoming data in accordance with one embodiment of the present invention.
Figure 4:
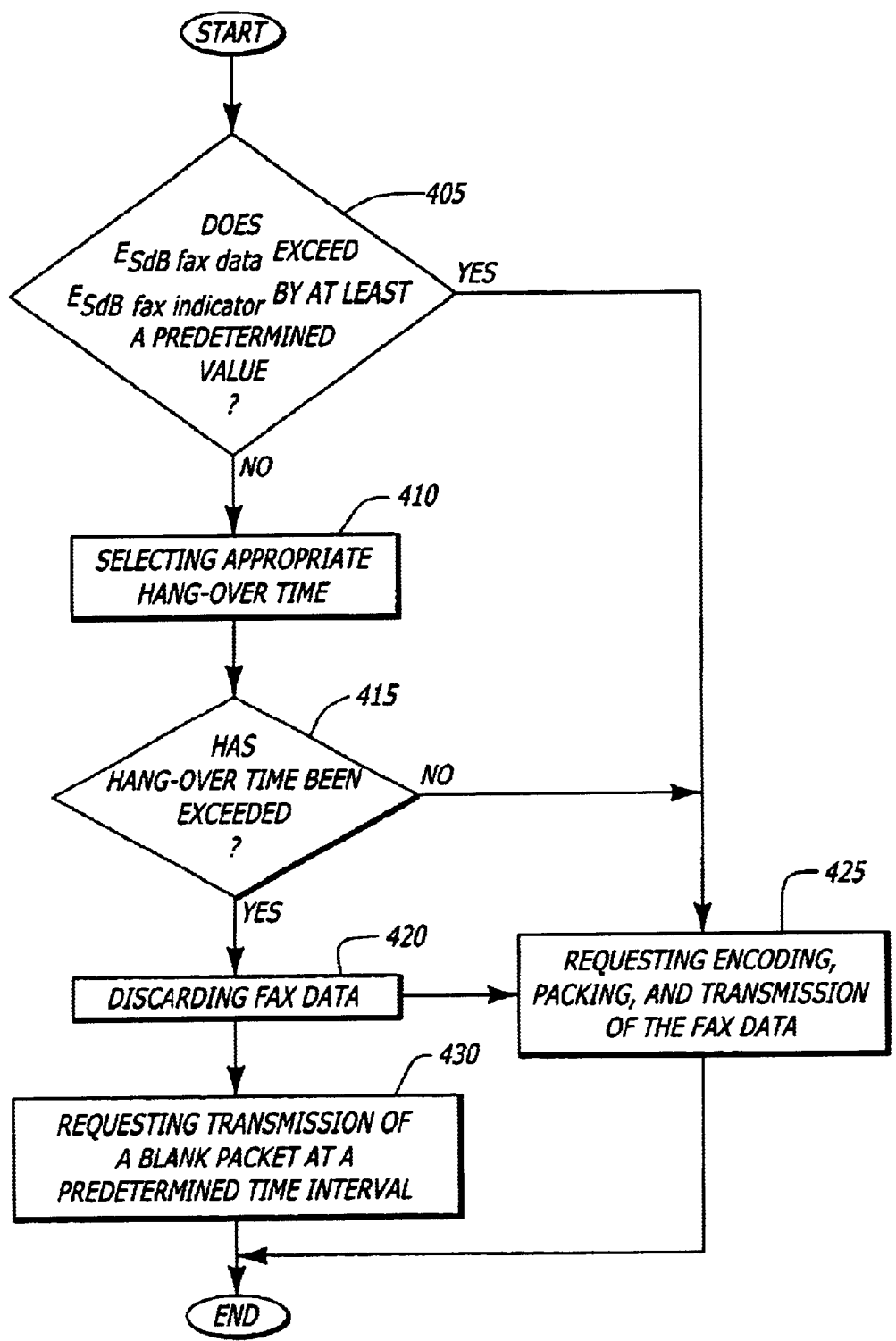
FIG. 4 outlines the operation of the fax idle suppression circuit.
Figure 5:
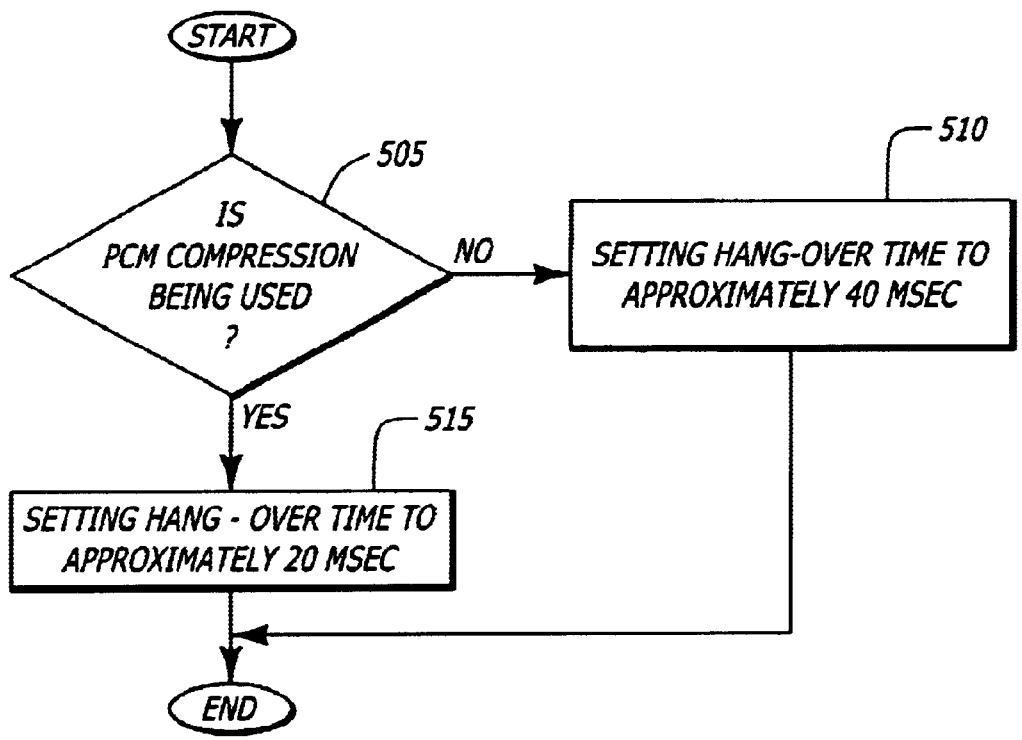
FIG. 5 outlines the process of selecting an appropriate hang over time.

Turning now to FIGS. 3, 4, and 5, it should be noted that the symbols "$E_{sdB\ fax\ indicator}$" and "$E_{sdB\ fax\ data}$" are used in FIGS. 3, 4, and 5 and the following discussion accompanying these figures. $E_{sdB\ fax\ indicator}$ denotes the short term energy in dB for the fax indicator signal. As stated above, source telecommunication devices typically transmit a 2,100-Hertz signal to indicate that a fax is about to be transmitted. $E_{sdB\ fax\ data}$ denotes the short term energy in dB for the fax data typically transmitted subsequent to the fax indicator signal.

FIG. 3 is a flow diagram outlining the processing of incoming data in accordance with one embodiment of the present invention. In block 305, the analysis task circuit monitors the incoming signal to detect a fax indicator signal specifying the beginning of a transmission of a fax. Source telecommunication devices typically transmit a 2,100-Hertz signal to indicate that a fax is about to be transmitted. As stated above and shown in FIG. 2, fax indicator detection circuit 240 is used to detect the fax indicator signal.

If no 2100-Hertz signal is detected, the incoming signal is presumed to contain speech data. The speech data is encoded and packed to produce compressed speech data conforming to a selected speech compression (block 310). The compressed speech data is put into packets, cells, or frames conforming to a selected network protocol and is transmitted over the network.

If a fax indicator signal (e.g., a 2100-Hertz signal) is detected, $E_{sdB\ fax\ indicator}$ and $E_{sdB\ fax\ data}$ are stored in blocks 315 and 320, respectively. As stated above, $E_{sdB\ fax\ indicator}$ is the short term energy in dB for the fax indicator signal, and $E_{sdB\ fax\ data}$ is the short term energy in dB for the fax data typically transmitted subsequent to the fax indicator signal. $E_{sdB\ fax\ indicator}$ and $E_{sdB\ fax\ data}$ are calculated using equations (1), (2), and (3), which are described above. Once $E_{sdB\ fax\ indicator}$ and $E_{sdB\ fax\ data}$ are stored, the fax idle suppression circuit is invoked in block 325.

FIG. 4 outlines the operation of the fax idle suppression circuit. In block 405, $E_{sdB\ fax\ indicator}$ and $E_{sdB\ fax\ data}$ are compared. If $E_{sdB\ fax\ data}$ exceeds $E_{sdB\ fax\ indicator}$ by a predetermined energy level, the fax data is considered to be valid fax data and is forwarded to be encoded, packed, and transmitted (block 425). In one embodiment, the predetermined energy level is approximately 15 dB.

If $E_{sdB\ fax\ data}$ fails to exceed $E_{sdB\ fax\ indicator}$ by a predetermined energy level, the fax idle suppression circuit waits for a selected length of time (or a hang over time), as shown in block 415, before discarding the void or invalid fax data, as shown in block 420. In other words, $E_{sdB\ fax\ data}$ must fail to exceed $E_{sdB\ fax\ indicator}$ by a predetermined energy level continuously for a selected hang over time before the fax idle suppression circuit determines that the fax data is void or invalid and discards the fax data. The purpose of waiting for a hang over time before discarding the void or invalid fax data is to avoid accidentally terminating transmission in a situation where periods of valid fax data transmission is interspersed with periods of idling or invalid fax data transmission.

FIG. 5 outlines the process of selecting an appropriate hang over time. The hang over time needed depends on the compression technique that is used. Accordingly, the fax idle suppression circuit determines whether PCM compression is used. If PCM compression is used, the hang over time is set to approximately twenty (20) milliseconds (msec), as shown in block 515. In the embodiment illustrated in FIG. 5, two exemplary compression techniques, including PCM and G.726, are presumed. Accordingly, if PCM compression is not used, it is presumed that G.726 is used. If G.726 compression is used, the hang over time is set at approximately forty (40) milliseconds, as illustrated in block 510. It should be noted that more than two compression techniques or algorithms can be implemented in alternative embodiments of the present invention.

Returning to FIG. 4, empty packets, cells, or frames are periodically transmitted at predetermined time intervals, as illustrated in block 430, to prevent the termination of a connection between a transmitting or source telecommunication device and a receiving or destination telecommunication device due to a truncation or timeout error. In one embodiment, one empty packet, cell, or frame is transmitted per time interval of approximately five hundred (500) milliseconds. However, the time interval can be adjusted to meet the needs of particular telecommunication systems.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system to suppress idle fax signals, comprising:
   a short term energy estimator to calculate a short term energy of a fax indicator signal and a short term energy of fax data subsequent to the fax indicator signal; and
   a fax idle suppression circuit in communication with the short term energy estimator to discard the fax data when the short term energy of the fax data fails to exceed the short term energy of the fax indicator signal by a predetermined energy level.

2. The system of claim 1, wherein the predetermined energy level is approximately fifteen (15) decibels.

3. The system of claim 1, wherein the fax idle suppression circuit discards the fax data when the short term energy of the fax data continuously fails to exceed the short term energy of the fax indicator signal by a predetermined energy level continuously for a selected time interval.

4. The system of claim 3, wherein the selected time interval is approximately twenty (20) milliseconds when Pulse Code Modulation (PCM) compression is used to compress the fax data.

5. The system of claim 3, wherein the selected time interval is approximately forty (40) milliseconds when G.726 compression is used to compress the fax data.

6. The system of claim 1, wherein the fax data is transmitted when the short term energy of the fax data exceeds the short term energy of the fax indicator signal by a predetermined energy level.

7. The system of claim 1, wherein the fax indicator signal is a 2100-Hertz signal.

8. The system of claim 1, further comprising a fax indicator detection circuit in communication with the short term energy estimator to detect the fax indicator signal.

9. The system of claim 1, further comprising a circuit to transmit a blank packet at a predetermined time interval to avoid termination of a connection between a transmitting telecommunication device and a receiving telecommunication device.

10. The system of claim 1, wherein the predetermined time interval is approximately five hundred (500) milliseconds.

11. A method of suppressing idle fax signals, comprising:
    detecting a fax indicator signal;
    calculating a short term energy of the fax indicator signal;
    calculating a short term energy of fax data subsequent to the fax indicator signal; and
    discarding the fax data when the short term energy of the fax data fails to exceed the short term energy of the fax indicator signal by a predetermined energy level.

12. The method of claim 11, further comprising:
    setting the predetermined energy level to approximately fifteen (15) decibels.

13. The method of claim 11, wherein discarding the fax idle suppression circuit includes:
    discarding the fax data when the short term energy of the fax data continuously fails to exceed the short term energy of the fax indicator signal by a predetermined energy level for a selected time interval.

14. The method of claim 13, further comprising:
    setting the selected time interval to approximately twenty (20) milliseconds when Pulse Code Modulation (PCM) compression is used to compress the fax data.

15. The method of claim 13, further comprising:
    setting the selected time interval to approximately forty (40) milliseconds when G.726 compression is used to compress the fax data.

16. The method of claim 11, further comprising:
    transmitting the fax data when the short term energy of the fax data exceeds the short term energy of the fax indicator signal by a predetermined energy level.

17. The method of claim 11, further comprising:
    transmitting a blank packet at a predetermined time interval to avoid termination of a connection between a transmitting telecommunication device and a receiving telecommunication device.

18. The method of claim 17, further comprising:
    setting the predetermined time interval to approximately five hundred (500) milliseconds.

19. A system to suppress idle fax signals, comprising:
    means for calculating a short term energy of a fax indicator signal and a short term energy of fax data subsequent to the fax indicator signal; and
    means for discarding the fax data when the short term energy of the fax data fails to exceed the short term energy of the fax indicator signal by a predetermined energy level continuously for a selected time interval.

20. The system of claim 19, wherein the predetermined energy level is approximately fifteen (15) decibels.

21. The system of claim 19, wherein the selected time interval is approximately twenty (20) milliseconds when Pulse Code Modulation (PCM) compression is used to compress the fax data.

22. The system of claim 19, wherein the selected time interval is approximately forty (40) milliseconds when G.726 compression is used to compress the fax data.

23. The system of claim 19, further comprising means for transmitting the fax data when the short term energy of the fax data exceeds the short term energy of the fax indicator signal by a predetermined energy level.

24. The system of claim 19, further comprising means for detecting the fax indicator signal.

25. The system of claim 19, further comprising means for transmitting a blank packet at a predetermined time interval to avoid termination of a connection between a transmitting telecommunication device and a receiving telecommunication device.

26. A computer program embodied on a computer-readable medium, comprising:

a short term energy estimator module to calculate a short term energy of a fax indicator signal and a short term energy of fax data subsequent to the fax indicator signal; and a fax idle suppression module in communication with the short term energy estimator to discard the fax data when the short term energy of the fax data fails to exceed the short term energy of the fax indicator signal by a predetermined energy level.

* * * * *